(12) United States Patent
Ito et al.

(10) Patent No.: US 6,641,218 B2
(45) Date of Patent: Nov. 4, 2003

(54) SEAT APPARATUS FOR AUTOMOBILE

(75) Inventors: Keishiro Ito, Yokohama (JP); Hiroyuki Wakayama, Tokyo (JP)

(73) Assignees: NHK Spring Co., LTD, Kanagawa (JP); Fuji Heavy Industries Ltd., Tokyo (JP)

( * ) Notice: Subject to any disclaimer, the term of this patent is extended or adjusted under 35 U.S.C. 154(b) by 0 days.

(21) Appl. No.: 10/067,970

(22) Filed: Feb. 8, 2002

(65) Prior Publication Data

US 2002/0105215 A1 Aug. 8, 2002

(30) Foreign Application Priority Data

Feb. 8, 2001 (JP) .......................................... 2001-032560

(51) Int. Cl.[7] ................................................ B60N 2/02
(52) U.S. Cl. ............................. 297/378.12; 297/378.14; 297/378.1; 297/341
(58) Field of Search ..................... 297/378.12, 378.1, 297/378.14, 341

(56) References Cited

U.S. PATENT DOCUMENTS

| | | | | |
|---|---|---|---|---|
| 3,853,373 A | * | 12/1974 | Corbett ........................ | 297/341 |
| 4,101,169 A | * | 7/1978 | Muraishi et al. ............ | 297/341 |
| 4,666,208 A | * | 5/1987 | Tatematsu et al. .......... | 297/341 |
| 4,909,570 A | * | 3/1990 | Matsuhashi ................. | 297/341 |
| 5,597,206 A | * | 1/1997 | Ainsworth et al. ..... | 297/378.12 |
| 6,152,533 A | * | 11/2000 | Smuk .......................... | 297/341 |
| 6,336,679 B1 | * | 1/2002 | Smuk ..................... | 297/378.12 |
| 6,474,739 B1 | * | 11/2002 | Lagerweij ................... | 297/341 |

* cited by examiner

Primary Examiner—Peter M. Cuomo
Assistant Examiner—Sarah C. Burnham
(74) Attorney, Agent, or Firm—Arent Fox Kintner Plotkin & Kahn, PLLC

(57) ABSTRACT

A seat apparatus for an automobile comprises: a seat cushion which is movable between a sitting position and a position for getting into and getting out of the automobile, the position is remote forward or rearward from the sitting position; a guide device for guiding the seat cushion between the sitting position and the position for getting into and getting out of the automobile; a backrest which is rotatably connected to the seat cushion via a hinge structure; a locking mechanism which causes the seat cushion to engage and disengage with the guide device, and a lock switching device is provided on the seat cushion and the backrest. The lock switching device releases an engagement between the seat cushion and the guide device performed by the lock mechanism and when the backrest is inclined forward to the seat cushion at a predetermined angle, and engages the seat cushion and the guide device with each other when the backrest is further inclined forward so as to be substantially horizontal.

3 Claims, 3 Drawing Sheets

SEAT APPARATUS FOR AUTOMOBILE

BACKGROUND OF THE INVENTION

1. Technical Field

The present invention relates to a seat apparatus for an automobile, in which a seat is slid in forward and rear directions thereof such that an automobile passenger can easily get into and get out of a rear seat, and in particular relates to improvement in structure in which a seat is folded forward and a back face thereof is used as a table.

2. Background Art

The above seat apparatus for an automobile is conventionally called a "walk-in seat". As such a seat apparatus, there has been provided one in which, when a front seat in a two-door car or a backrest of a second seat in a car having four or more-doors, such as a one-box car, a minivan or the like are inclined forward, engagement between a seat cushion of the seat and a slide rail supporting the seat cushion is released and the seat is moved forward so that a passenger can get into and get out of a seat positioned rearward of the seat. Also, as a recent seat apparatus for an automobile, there is provided one with a high level of convenience in which a backrest is further foldable forward from the above-described state so as to be substantially horizontal so that the back face of the backrest can be used as a table or a floor surface for a baggage compartment.

In the seat apparatus for an automobile as in the above, since a lock of the slide rail is unlocked by inclining the backrest forward, it is difficult to use the back face of the backrest as a table or a floor of a baggage compartment due to movement of the backrest during use. For this reason, in the conventional seat apparatus for an automobile, two kinds of hinge structures for rotatably connecting the seat cushion and the backrest (seatback) of the seat to each other are respectively provided for a passenger to get into and get out and for setting a table (or baggage compartment floor). In a case in which the backrest is inclined forward using the hinge structure for the table (or baggage compartment floor), the system is employed such that the engagement between the seat cushion and the slide rail is maintained. Therefore, there is a problem in that the weight of the seat apparatus for an automobile and the number of parts are increased.

SUMMARY OF THE INVENTION

In view of the above, an object of the present invention is to provide a seat apparatus for an automobile which allows engagement and disengagement between a seat cushion and a slide rail by using one hinge structure.

According to an aspect of the present invention, there is provided a seat apparatus for an automobile comprising: a seat cushion which is movable between a sitting position and a position for getting into and getting out of the automobile, the position is remote forward or rearward from the sitting position; a guide device for guiding the seat cushion between the sitting position and the position for getting into and getting out of the automobile; a backrest which is rotatably connected to the seat cushion via a hinge structure; a locking mechanism which causes the seat cushion to engage and disengage with the guide device, and a lock switching device is provided on the seat cushion and the backrest. The lock switching device releases an engagement between the seat cushion and the guide device performed by the lock mechanism and when the backrest is inclined forward to the seat cushion at a predetermined angle, and engages the seat cushion and the guide device with each other when the backrest is further inclined forward so as to be substantially horizontal.

In the seat apparatus for an automobile constructed in the above, since the engagement of the seat cushion by the lock mechanism is released by inclining the seat back forward at the predetermined angle, a passenger can get into and get out of a seat, for example, on the rear side of the seat cushion by moving the seat cushion relative to the guide device. Then, in a case in which the seat back is further inclined forward so as to be substantially horizontal and the back face of the seat back is used as a table or a baggage compartment floor, since the seat cushion is engaged with the guide device again, the seat cushion is prevented from being moved in use thereby achieving convenience in use. Furthermore, since engagement and disengagement of the seat cushion can be performed by one hinge structure, the number of parts can be decreased and the weight and manufacturing cost of the seat apparatus can be reduced.

Specifically, the lock switching device may comprise a cam which is provided coaxially with a rotating shaft of the backrest and an arm whose intermediate portion is rotatably provided at the backrest. In this case, one end portion of the arm slidably contacts with the cam and the other end portion thereof is connected to the lock mechanism. The cam rotates the arm when the seat back is inclined forward at a predetermined angle, and it allows rotation of the arm in the reverse direction when the seat back is further inclined forward so as to be substantially horizontal. For example, such a structure can be employed such that, when the backrest is inclined forward at a predetermined angle, a large diameter portion of the cam pushes the one end portion of the arm to rotate it. Then, when the large diameter portion of the cam passes through the arm, the arm is rotated in the reverse direction by a biasing force of the lock mechanism, for example. Thereby, the lock mechanism connected to the other end portion of the arm is actuated, so that disengagement between the seat cushion and the guide portion and re-engagement therebetween are performed sequentially.

DETAILED DESCRIPTION OF THE EMBODIMENTS

Figure 1:
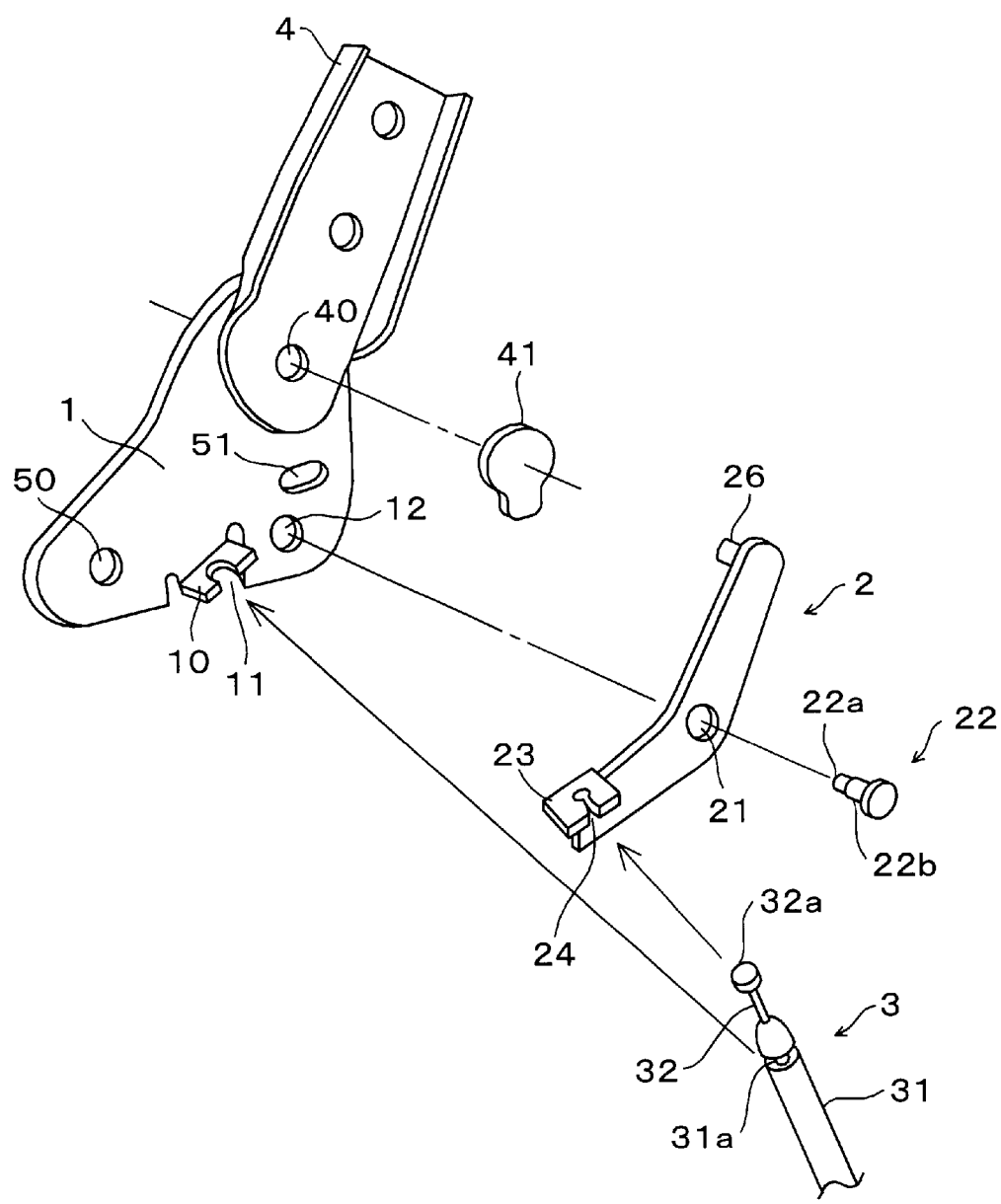
FIG. 1 is a perspective view showing a seat apparatus for an automobile of an embodiment according to the present invention.

An embodiment of the present invention will be explained with reference to FIGS. 1 to 4. FIG. 1 is a perspective view schematically showing a main portion of a seat apparatus for an automobile of an embodiment. In the figure, reference numeral 1 denotes a seat cushion bracket (seat cushion), and it forms a portion of a frame of a seat cushion (not shown). The seat cushion is supported on guide rails mounted on a vehicle body floor of an automobile slidably in forward and rearward directions (a travelling direction of the automobile and the reverse direction thereto).

A hook 10 projecting in a side or transverse direction of an automobile is formed at a central portion of the seat cushion bracket 1 in the vicinity of a lower end portion thereof. A groove 11 opened towards the side direction is formed at a central portion of the hook 10. Also, a female screw 12 is formed at a portion of the bracket 1 which is spaced from the hook 10 in a side direction.

In the figures, reference numeral 2 denotes an arm. The arm 2 is formed with a hole 21 at its intermediate portion in a longitudinal direction thereof. A fitting portion 22b of a stepped pin 22 formed at its tip end with a screw portion 22a is fitted into the hole 21 and the screw portion 22a is screwed into the female screw 12, whereby the arm 2 is rotatable about the stepped pin 22. A method for mounting the stepped pin 22 is not limited to the above screw fitting, and any means may be freely selected as the mounting method such that a hole is prepared on the bracket instead of the female screw 12 and a pin portion is formed on the stepped pin 22 instead of the screw portion 22a thereof, and the pin portion is inserted into the hole, so that an end of the pin portion is caulked, for example. A hook 23 projecting in the same direction as that of the above hook 10 is formed at one end portion of the arm 2. A groove 24 opened in a side direction of the automobile is formed at a central portion of the hook 23.

A pull cable 3 is connected to the hooks 10 and 23. The pull cable 3 comprises an outer cable 31 and an inner cable 32 which is slidably inserted into a hollow section of the outer cable 31. A groove 31a is formed at one end portion of the outer cable 31 and the groove 31a is engaged with the groove 11 of the hooks 10. A head 32a with a large diameter is fixed to one end portion of the inner cable 32, and the head 32a is engaged with the groove 24 of the hook 23. Also, the other end portion of inner cable 32 is connected to a lock mechanism which causes the seat cushion to engage and disengage with a slide rail. The lock mechanism is actuated so as to release an engagement between the seat cushion and the slide rail by pulling the inner cable 32 from the outer cable 31. Also, in such a state, the lock mechanism is pulling the inner cable 32 elastically, and when a load is removed from the inner cable 32, the inner cable 32 is pulled into the outer cable 31 by an elastic force by the lock mechanism, so that the seat cushion and the slide rail are again engaged with each other by the lock mechanism. In the figures, reference numerals 50 and 51 denote holes for mounting the seat cushion bracket 1 to the seat cushion frame, and the hole 51 positioned on a rear side is formed in an oval shape in order to compensate a machining errors.

A back bracket (backrest) 4 forming a portion of a frame of a backrest (not shown) is rotatably connected to an upper end portion of the seat cushion bracket 1 formed as above through a shaft (rotating shaft) 40. The back bracket 4, the shaft 40, and the seat cushion bracket 1 construct a portion of a reclining (hinge) mechanism of a seat. The back bracket 4 is fixed to the seat cushion bracket 1 at a predetermined or arbitrary angle thereto by providing known means which causes the seat cushion bracket 1 and the back bracket 4 to be engaged and disengaged with each other.

Here, a cam 41 with an axis coincident with that of shaft 40 is fixed to the back bracket 4. On the other hand, a pin 26 projecting towards the cam 41 is fixed to the other end portion of the arm 2, and a side surface of the pin 26 contacts with the cam 41. With this construction, when the back bracket 4 is rotated, the cam 41 rotates and the cam surface of the cam 41 presses the pin 26 so that the arm 2 is rotated. Then, the one end portion of the arm 2 pulls the inner cable 32 from the outer cable 31 to actuate the lock mechanism, thereby releasing the engagement between the seat cushion and the slide rail.

Figure 2:
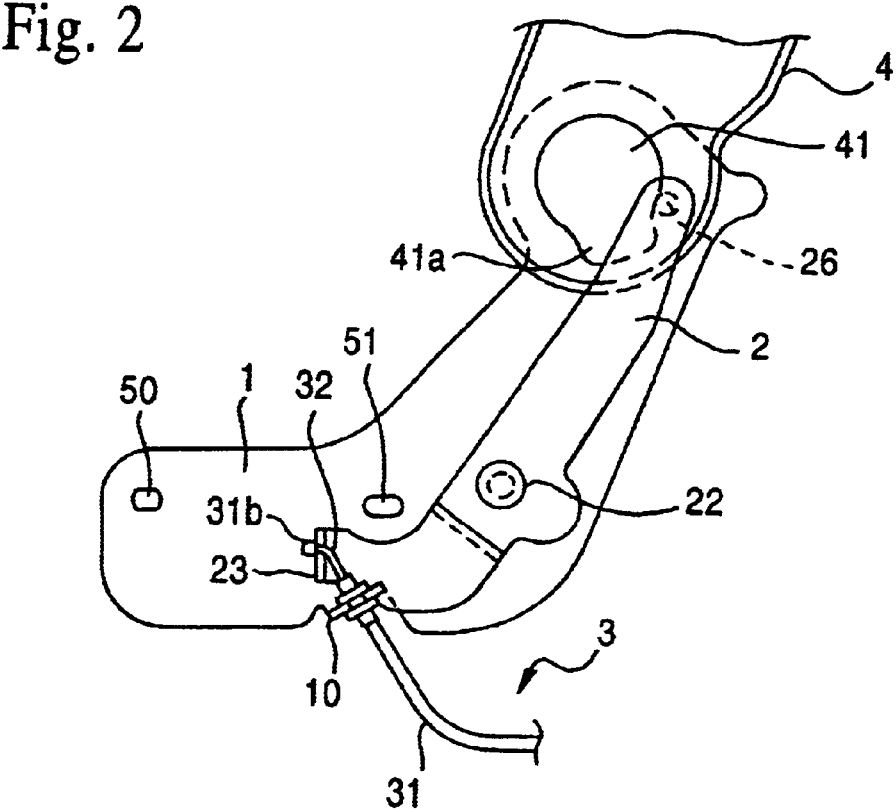
FIG. 2 is a side view showing the seat apparatus for an automobile of the embodiment.

Operation of the seat apparatus for an automobile constructed as above will be explained in detail with reference to FIGS. 2 to 4. FIG. 2 shows a position of the back bracket 4 when a passenger gets into a vehicle. In the state shown in FIG. 2, the pin 26 is positioned on a right side of a cam protrusion 41a of the cam 41. The back bracket 4 can be fixed at a position where it has been further inclined rearward from the state shown in FIG. 2. In this case, since the cam 41 rotates in a clockwise direction on the figure, the pin 26 is prevented from being pressed by the cam protrusion 41a.

On the other hand, in a case in which the seat is put in a walk-in state, the back bracket 4 is rotated in a counterclockwise direction from the state shown in FIG. 2. As shown in FIG. 3, the cam protrusion 41a presses the pin 26 to rotate the arm 2. The hook 23 of the arm 2 pulls the inner cable 32 from the outer cable 31 and the lock mechanism actuates so as to release the engagement between the seat cushion and the slide rail. The seat can thereby be moved in forward and reward directions.

Figure 3:
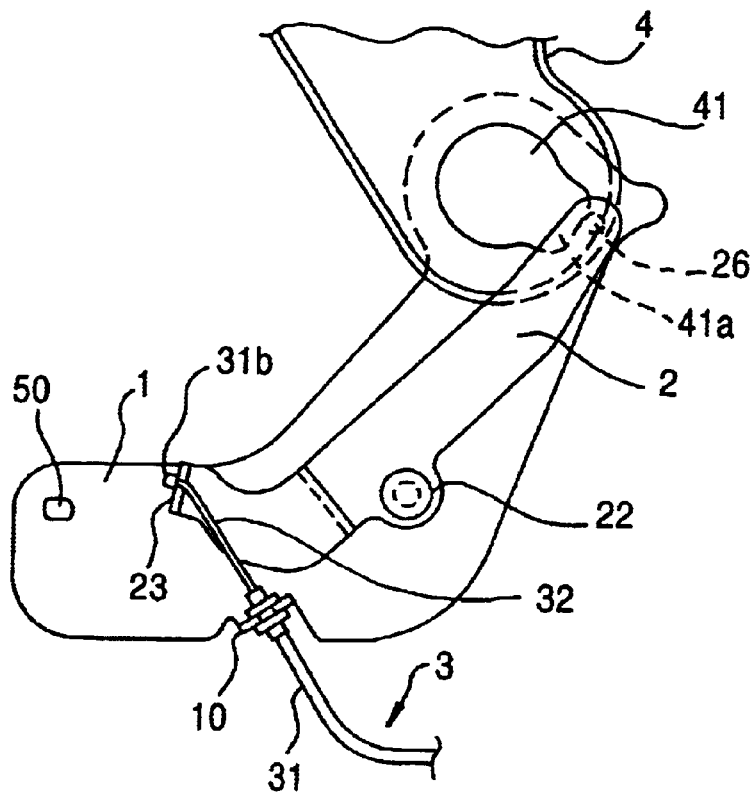
FIG. 3 is a side view showing a state where a backrest has been inclined forward from a state shown in FIG. 2.
Figure 4:
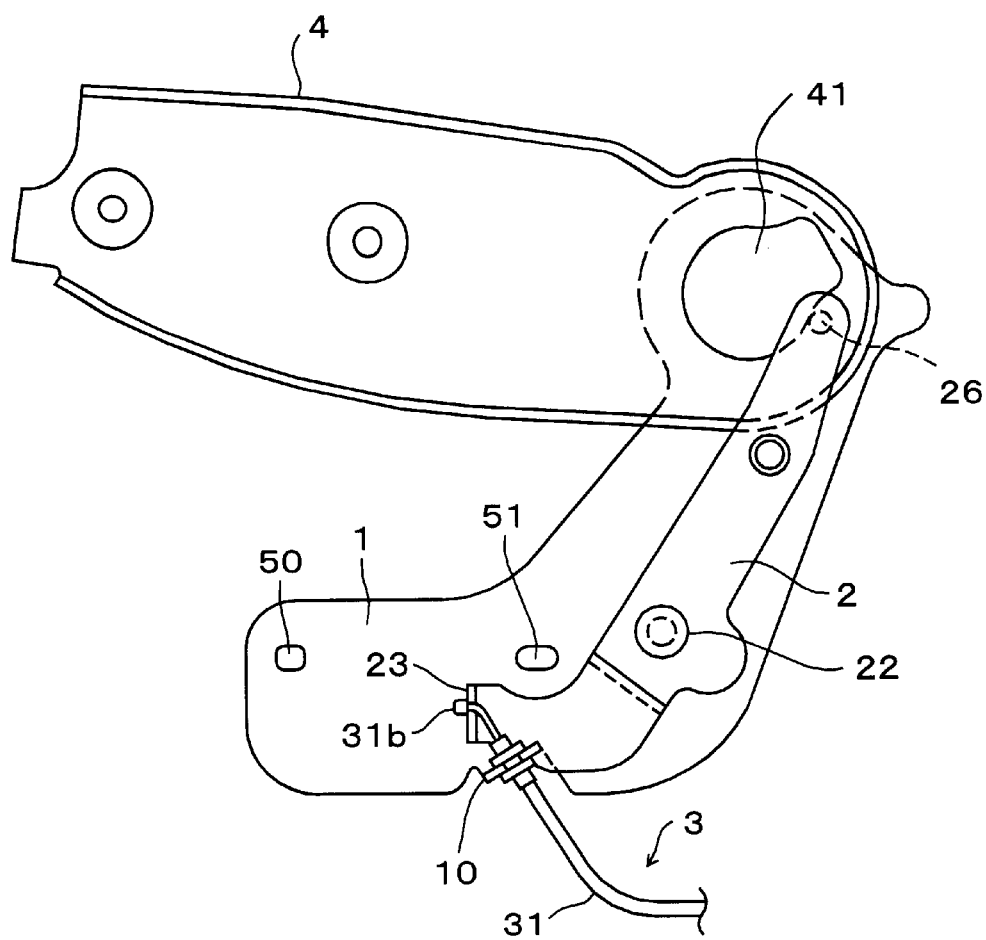
FIG. 4 is a side view showing a state where the backrest has been further inclined forward from a state shown in FIG. 3 so as to be substantially horizontal.

In a case in which the backrest is used as a table or a baggage compartment floor, the back bracket 4 is further rotated in the counterclockwise direction from the state shown in FIG. 3. The cam protrusion 41a passes through the pin 26 so that the pressing force acting on the arm 2 is cancelled. Then, the inner cable 32 is pulled into the outer cable 31 by an elastic force imparted by the lock mechanism, and the lock mechanism again engages the seat cushion and the slide rail with each other. Therefore, since the backrest is prevented from being moved while the back surface of the backrest is being used as a table or a baggage compartment floor, the backrest is easy to use. It should be noted that, even in the states shown in FIGS. 3 and 4, the back bracket 4 can be fixed by the reclining mechanism. Also, when the back bracket 4 is rotated in the clockwise direction from the state shown in FIG. 4, the engagement between the seat cushion and the slide rail is canceled in the order reverse to the above and a re-engagement between both is performed.

In the seat apparatus for an automobile thus structured, since an engagement between the seat cushion and slide rail and disengagement from each other can be performed by one reclining mechanism, the number of parts can be reduced so that the weight and manufacturing cost of the seat apparatus can be reduced. In particular, since the above embodiment employs such a simple structure that the lock mechanism is driven by the cam 41 and the arm 1, such advantages as reduced fault occurrence rate and high reliability can be achieved.

What is claimed is:

1. A seat apparatus for an automobile comprising:
   a seat cushion which is movable within a moving area defined between a sitting position and a position for getting into and getting out of the automobile, the position is remote forward or rearward from the sitting position, the seat cushion being locked and unlocked within the moving area;
   a backrest which is rotatably connected to the seat cushion via a hinge structure; and
   a lock switching device which is provided on the seat cushion and the backrest;
   wherein the lock switching device is driven by the backrest and unlocks the seat cushion which has been locked when the backrest is inclined forward to the seat cushion at a predetermined angle, and is driven by the backrest and locks the seat cushion when the backrest is further inclined forward so as to be substantially horizontal.

2. The seat apparatus for an automobile according to claim 1, wherein the lock switching device is provided with a cam provided coaxially with a rotating shaft of the backrest and an arm whose intermediate portion is rotatably provided at the seat cushion, one end portion of the arm slidably contacts with the cam, rotation of an opposite end portion of the arm in a direction causes unlock of the seat cushion, and rotation of the opposite end portion of the arm in an opposite direction causes lock of the seat cushion, the cam rotates the arm when the backrest is inclined forward at the predetermined angle, and allows rotation of the arm in an opposite direction when the backrest is further inclined forward so as to be substantially horizontal, so that unlock of the seat cushion and lock of the seat cushion are sequentially performed.

3. The seat apparatus for an automobile according to claim 2, wherein the lock switching device comprises a pull cable having an outer cable and an inner cable which is slidably inserted into a hollow section of the outer cable, one end portion of the inner cable is connected to the opposite end of the arm, so that the seat cushion is unlocked when the arm is rotated and the inner cable is pulled from the outer cable.

* * * * *